United States Patent [19]

deMonterey et al.

[11] 4,332,354
[45] Jun. 1, 1982

[54] PROCESS FOR PREPARING TRANSPARENT IRON OXIDE PIGMENT DISPERSIONS

[75] Inventors: Francis G. deMonterey, Hopkins; Bharat J. Adhia; David M. Johnson, both of Holland, all of Mich.

[73] Assignee: BASF Wyandotte Corporation, Wyandotte, Mich.

[21] Appl. No.: 221,969

[22] Filed: Jan. 2, 1981

[51] Int. Cl.³ .................. B02C 17/14; C03C 3/00; C03C 3/08; C03C 3/10
[52] U.S. Cl. .................. 241/16; 106/304; 106/309; 241/172; 241/184; 501/33; 501/34; 501/61; 501/62; 501/65; 501/66
[58] Field of Search .................. 106/304, 309, 53; 241/184, 16, 172; 501/33, 34, 61, 62, 65, 66

[56] References Cited

U.S. PATENT DOCUMENTS

| | | | |
|---|---|---|---|
| 1,327,061 | 1/1920 | Penniman et al. | 106/304 |
| 2,558,304 | 6/1951 | Marcot et al. | 106/304 |
| 3,934,825 | 1/1976 | Delfosse | 241/184 |
| 4,063,957 | 12/1977 | Von Lauff et al. | 106/304 |

FOREIGN PATENT DOCUMENTS

| | | | |
|---|---|---|---|
| 400737 | 4/1966 | Australia | 65/21.1 |
| 508315 | 12/1954 | Canada | 106/304 |
| 2210279 | 9/1973 | Fed. Rep. of Germany | 106/304 |
| 52-5814 | 1/1977 | Japan | 106/53 |
| 54-126547 | 3/1979 | Japan | 106/53 |
| 55-104658 | 8/1980 | Japan | 241/184 |
| 55-126548 | 9/1980 | Japan | 501/33 |

OTHER PUBLICATIONS

Leiser, C. F. "Importance of Lead in Glass"–The Glass Industry—Oct. 1963, pp. 574–576 and p. 594.
Willott, W. H. "The Hardness of Glass", J. Soc. Glass Technology 34, (1950), p. 77.

*Primary Examiner*—Helen M. McCarthy
*Attorney, Agent, or Firm*—David L. Hedden; Joseph D. Michaels

[57] ABSTRACT

This invention relates to a process for preparing transparent iron oxide pigment dispersions. The dispersions are prepared by milling a mixture of iron oxide pigment and a liquid vehicle in a bead mill containing glass beads as the grinding media. The pigment dispersions can be used in the preparation of paints and coatings which exhibit transparent quality and absorb ultraviolet radiation.

10 Claims, No Drawings

PROCESS FOR PREPARING TRANSPARENT IRON OXIDE PIGMENT DISPERSIONS

BACKGROUND OF THE INVENTION

1. Field of the Invention

This invention relates to the preparation of transparent iron oxide pigment dispersions. The dispersions are prepared by milling a mixture of iron oxide pigment and liquid vehicle in a bead mill containing glass beads as the grinding media.

2. Description of the Prior Art

Transparent iron oxide pigment dispersions have traditionally been prepared by a modified flushing process. Flushing refers to the direct transfer of pigment particles from an aqueous to a nonaqueous phase. The aqueous phase is mixed with a nonaqueous liquid vehicle with heavy-duty mixers. The water separates from the system and is removed, leaving the pigment dispersed in the liquid vehicle.

This process is rather cumbersome and labor intensive. The resulting dispersion must be thinned, drum settled, filtered and standardized. Moreover, this process is a batch process and much of the iron oxide pigment may be wasted in this process.

Other techniques are known in the art for dispersing pigments into liquid vehicles. The most pertinent technique involves the milling of a pigment-vehicle mixture in a bead mill which contains, as the grinding media, glass beads having small diameters.

Although this technique has been used for making various pigment dispersions, to applicants' knowledge, it has not been used for making transparent iron oxide pigment dispersions. There are several possible reasons for this. In order to obtain transparent iron oxide pigment dispersions, the average particle size of the pigment must be less than 0.1 micron in size. Unless the average particle size of the pigment is below this size, the pigment is unable to transmit visible light which has wavelengths from 400 to 700 millimicrons. It is difficult to find grinding media which will produce iron oxide pigment dispersions with particles of this size. It is also difficult to find grinding media which are strong enough to withstand the contact with iron oxide pigment which is more abrasive than most pigments.

SUMMARY OF THE INVENTION

The applicants have solved the problems disclosed in the prior art by developing a process for preparing transparent iron oxide pigment dispersions comprising milling a mixture of iron oxide pigment and liquid vehicle in a bead mill which contains glass beads having a diameter of 0.1 millimeter to 2.0 millimeter, a Rockwell Hardness of 45 to 70, and a density of 2.5 to 4.0 g/cc.

It is surprising that transparent iron oxide pigments can be prepared by this process without causing the grinding media to shatter. The process can be run continuously, which is an advantage over flushing processes. It also is not as labor intensive.

The resulting iron oxide pigment dispersions can be used in the preparation of paints or coatings which exhibit transparent quality and absorb ultraviolet radiation.

DESCRIPTION OF THE PREFERRED EMBODIMENT

Transparent iron oxide pigment dispersions are prepared in accordance with applicants' invention by milling a mixture of iron oxide pigment and liquid vehicle in a bead mill containing certain glass beads as the grinding media. Although a batch process can be used to prepare iron oxide pigment dispersions in accordance with this invention, a continuous process is preferred. In order to practice this invention as a continuous process, a mixture of iron oxide pigment and liquid vehicle is preferably pumped from a first holding container into a bead mill where the dispersion process commences. The pressure of the incoming mixture of iron oxide pigment and liquid vehicle helps to force the mixture through the bead mill into a second holding container. If more than one pass through the bead mill is needed to disperse the pigment effectively into the liquid vehicle, then the mixture from the second holding container can be repumped through the bead mill into the first holding container. Alternatively, the mixture from the second holding tank can be pumped into a second bead mill from which it will be forced into a third holding container. Metering pumps and microprocessors can be used to monitor and control feed rates, in-line viscosity, pressure and temperature in the mill, and flow rates.

Those of ordinary skill in the art are familiar with the iron oxide pigment and liquid vehicles which may be used in accordance with this invention. The iron oxide pigment used in this process may be naturally occurring iron oxide or iron oxide manufactured in accordance with known processes such as those described in U.S. Pat. Nos. 1,327,061 and 2,558,302 which are hereby incorporated by reference into this application. Typically, iron oxide pigment is prepared by alkali precipitation of ferrous compounds from a solution of water soluble ferrous salt, oxidation of the precipitated ferrous compound to the ferric state, followed by filtration, washing, and finally drying at various temperature ranges. Iron oxide pigments of various colors can be prepared by controlling the temperature and rate of oxidation, and by subsequently calcining the pigments at high temperatures.

The liquid vehicles used in accordance with this invention are composed of a resin and/or drying oil, a solvent, and additives. Alkyd, acrylic, and various other resins are usually used as the resin component. Linseed oil and other cross-linkable oils are often used as drying oils. Mineral spirits or hydrocarbon solvents such as xylene, and various esters and ester-ethers are used as solvents in the liquid vehicle formulation. Additives such as surfactants, antioxidants, viscosity stabilizers, plasticizers, and ultraviolet absorbers may also be used in the liquid vehicle formulation.

The brief descriptions of the iron oxide pigment and liquid vehicle used will be sufficient for those of ordinary skill in the art to understand the nature of this aspect of applicants' invention. Their knowledge of the prior art and their experience will enable them to formulate an effective pigment-vehicle mixture. The variables involved and their interrelationships are discussed in the reference by Patton, Temple C., *Paint Flow and Pigment Dispersion,* John Wiley and Sons, New York, (1979). It should be noted, however, that the pigment-vehicle mixture should appear to be homogeneous to the naked eye. Lumps in the pigment-vehicle mixture may cause the equipment to become plugged.

As was previously stated, the mixture of iron oxide pigment and liquid vehicle is pumped into a bead mill. The components of the bead mill are a cylindrical container, a shaft which has metal impellers attached to it, a separator means, and a motor. Glass beads are placed in the cylindrical container and are used as the grinding media.

As the mixture of iron oxide pigment and liquid vehicle is pumped into the mill container, the motor causes the shaft within the mill to rotate the impellers which are attached to it. The forces created by the rotation of the disk-like impellers and the agitation of the beads cause the pigment to become dispersed in the liquid vehicle. The bead mill is preferably a horizontal bead mill containing disk-like impellers which are flat annular disks. The separator means may be a screen, circular in shape, with a diameter equal to the diameter of the mill container, or an adjustable gap. If a mill with an adjustable gap is used, it is set in such a manner that it amounts to not more than 0.3 to 0.35 times the diameter of the media used. The function of the separator means is to trap the media so they will not flow out with the dispersed pigment. If a screen is used, the mesh size should be small enough to do this, but still allow the pigment dispersion to pass through. The reference by Patton, Temple C., *Paint and Pigment Dispersion*, Chapter 21, John Wiley and Sons, New York (1979) describes the types of mills which may be used in applicants' process.

The grinding media used in the bead mill are glass beads having a diameter of 0.1 millimeter to 2.0 millimeters, a Rockwell Hardness of 45 to 70, and a density of 2.50 to 4.00 g/cc. Although the glass beads may be cylindrical or nodular in shape, they are preferably spherical.

The glass beads consist essentially of 58 percent to 70 percent by weight of $SiO_2$; 0 percent to 25 percent by weight of PbO; 5 percent to 9 percent by weight of $K_2O$; 4 percent to 11 percent by weight of $Na_2O$; 2 percent to 3 percent by weight of $B_2O_3$; 0 percent by 5 percent by weight of BaO; 0 percent to 5 percent by weight of CaO; and 0 percent to 2 percent by weight of trace elements. Preferably the beads consist essentially of either of the following compositions:

a. Lead-containing Beads
  1. 58% by weight $SiO_2$;
  2. 25% by weight PbO;
  3. 9% by weight $K_2O$;
  4. 4% by weight $Na_2O$;
  5. 2% by weight $B_2O_3$; and
  6. 2% by weight of trace elements b. Lead-free Beads
  1. 70% by weight $SiO_2$;
  2. 2% by weight $Al_2O_3$;
  3. 5% by weight CaO;
  4. 5% by weight BaO;
  5. 5% by weight $K_2O$;
  6. 11% by weight $Na_2O$; and
  7. 2% by weight $B_2O_3$.

The nature of the grinding media used in accordance with this invention is critical. It has been found that other media such as steel shot do not provide iron oxide pigments which are transparent. Experiments with glass grinding media other than the ones described in this invention have been unsuccessful. It was found that other types of glass grinding media will shatter. This probably occurs because the iron oxide pigment is too abrasive for the media.

Although the volume of the mill container occupied by grinding media may vary over wide ranges, it has been found that maximum efficiency is obtained if 70 percent to 95 percent of the volume of the mill container is occupied by the glass grinding media. It has also been found that, although the linear peripheral velocity of the disks may vary over wide ranges, maximum efficiency will be obtained if it is between 10 and 20 meters per second.

As the mixture leaves the mill, it is collected in a holding container. It can be tested by using a Hegman grind gauge, or any other method which is known to those skilled in the art, in order to determine if the iron oxide pigment has been satisfactorily dispersed in the liquid vehicle. What is satisfactory will depend upon the specifications and goals of the formulator. If the dispersion is satisfactory, it can be thinned and standardized. If it is not satisfactory, the mixture can be passed through the mill until product specifications are achieved. In order to determine if the iron oxide pigment dispersion is transparent, a sample of the dispersion is smeared on clear glass and viewed at a 45 degree angle against a Morest card (black stripe on a white background). The smear is visually compared to a standard which has the desired transparency.

The following examples will explain the invention in more detail. They are not intended to limit its application and scope in any way. Unless otherwise designated, parts are given in parts by weight and temperatures are given degrees centigrade.

EXAMPLE 1

A premix consisting of 25 percent red iron oxide pigment, 30 percent alkyd resin solids, 42 percent mineral spirits, and 3 percent additives (antioxidants, surfactants, viscosity stabilizers, etc.) was formed. The mixture was milled in a horizontal bead mill known as the Dyno KD-5 manufactured by Maschinenfabrik Willy Bachofen, Basel, Switzerland. The grinding media used were the lead-free glass grinding media described previously having average diameters of 0.45 millimeter to 0.50 millimeter. Three passes were made through the mill. The first pass was run at mill speed of 2190 rpm. and a throughput rate of 2 lb/min. The second and third passes were made at a mill speed of 1465 rpm. and a throughput rate of 2½ lb/min.

The pigment dispersion prepared in accordance with this Example was used to prepare a smear on a clear glass surface which is viewed at a 45 degree angle against a Morest card. This smear was compared to a standard which has been made with a pigment dispersion prepared in accordance with a modified flushing process and which was satisfactory in transparency. The pigment dispersion prepared in accordance with this example was equal in transparency to the standard.

EXAMPLE 2

A premix consisting of 25 percent yellow iron oxide pigment, 33 percent acrylic resin solids, 40 percent xylene and 2 percent additives (antioxidants, surfactants, viscosity stabilizers, etc.) was formed. The mixture was milled in the horizontal bead mill used in Example 1 with the grinding media described therein. The mill speed was set at 1465 rpm. and the throughput rate was 1½ lb/min. Three passes were made through the mill.

The pigment dispersion prepared in accordance with this Example was used to prepare a smear on a clear glass surface. This smear was compared to the standard prepared by a modified flushing process. The pigment dispersion prepared in accordance with this Example was equal in transparency to the standard.

Examples 1 and 2 illustrate that it is possible to disperse red and yellow iron oxide pigments into various liquid vehicles by using a horizontal bead mill containing glass grinding media. The products are transparent iron oxide pigment dispersions, and they can be produced on a continuous basis.

COMPARISON EXAMPLE

A premix consisting of 25 percent red iron oxide pigment, 30 percent additives (antioxidants, surfactants, viscosity stabilizers, etc.) was formed. The mixture was milled in the horizontal bead mill of Example 1 with steel shot grinding media having an average diameter of 3/32 inch. The mill speed was set at 2190 rpm. with a throughput rate of 2 pounds per minute.

The pigment dispersion prepared in accordance with this Example was used to prepare a smear on a clear glass surface. This smear was compared to the standard of Example 1. The pigment dispersion prepared in accordance with this example was not satisfactory with respect to its transparency.

The embodiments of this invention in which an exclusive property or privilege is claimed are defined as follows:

1. A process for preparing transparent iron oxide dispersions comprising
    milling a mixture of iron oxide pigment and liquid vehicle in a bead mill containing glass beads having a diameter of 0.1 millimeter to 2.0 millimeters, and a density of 2.50 to 4.00 g/cc, wherein said glass beads consist essentially of
    A. 58 percent to 70 percent by weight of $SiO_2$,
    B. 0 percent to 25 percent by weight of PbO,
    C. 5 percent to 9 percent by weight of $K_2O$,
    D. 4 percent to 11 percent by weight of $Na_2O$,
    E. 2 percent to 3 percent by weight of $B_2O_3$,
    F. 0 percent to 5 percent by weight of BaO,
    G. 0 percent to 5 percent by weight of CaO,
    H. 0 percent to 2 percent by weight of $Al_2O_3$, and
    I. 0 percent to 2 percent by weight of trace elements.
2. The process of claim 1 wherein the glass beads are spherical in shape.
3. The process of claim 1 wherein the bead mill is a horizontal beam mill containing metal disk-like impellers connected to a shaft which rotates within the mill container.
4. The process of claim 3 wherein the disk-like impellers are flat annular disks.
5. The process of claim 1 wherein the glass beads
    A. consist essentially of
        1. 58% by weight of $SiO_2$;
        2. 25% by weight of PbO;
        3. 9% by weight of $K_2O$;
        4. 4% by weight of $Na_2O$;
        5. 2% by weight of $B_2O_3$; and
        6. 2% by weight of trace elements;
    B. have a diameter of 0.25 millimeter, and
    C. have a Rockwell Hardness of approximately R-47.
6. The process of claim 1 wherein the glass beads consist essentially of
    A. 70% by weight $SiO_2$;
    B. 2% by weight $Al_2O_3$;
    C. 5% by weight CaO;
    D. 5% by weight BaO;
    E. 5% by weight $K_2O$;
    F. 11% by weight $Na_2O$; and
    G. 2% by weight $B_2O_3$.
7. The process of claim 1 wherein the mixture of iron oxide pigment and vehicle is pumped into the mill from a holding container.
8. The process of claim 7 wherein the dispersed pigment is pumped from the mill into a holding container.
9. The process of claim 3 wherein the peripheral velocity of the impeller is 10 to 20 meters per second.
10. The process of claim 1 wherein 70% to 90% of the volume of the mill is occupied by glass beads.

* * * * *